(12) United States Patent
Betzler et al.

(10) Patent No.: US 8,352,326 B2
(45) Date of Patent: Jan. 8, 2013

(54) METHOD, HARDWARE PRODUCT, AND COMPUTER PROGRAM PRODUCT FOR IMPLEMENTING COMMERCE BETWEEN VIRTUAL WORLDS

(75) Inventors: Boas Betzler, Magstadt (DE); Sandra L. Kearney, Harleysville, PA (US); Tanaz Sowdagar, San Francisco, CA (US); Hagen R. Wenzek, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/268,471

(22) Filed: Nov. 11, 2008

(65) Prior Publication Data

US 2010/0121729 A1 May 13, 2010

(51) Int. Cl.
*G06Q 30/00* (2006.01)
(52) U.S. Cl. ...................................................... 705/26.1
(58) Field of Classification Search ..................... 705/26, 705/27, 26.1
See application file for complete search history.

(56) References Cited

U.S. PATENT DOCUMENTS

| | | | |
|---|---|---|---|
| 6,901,379 B1 | 5/2005 | Balter et al. | |
| 7,143,358 B1 | 11/2006 | Yuen | |
| 7,249,139 B2 * | 7/2007 | Chuah et al. | 707/102 |
| 2003/0078765 A1 | 4/2003 | Hoffmaster | |
| 2004/0059644 A1 | 3/2004 | Blau | |
| 2007/0038559 A1 | 2/2007 | Jung et al. | |

OTHER PUBLICATIONS

Jordan, J. "Reality Cheque", New Scientist, Jul. 26, 2003, 2p., v179, n 2405 Reed Elsevier, United Kingdom.
Virtual Cash Exchange Goes Live, [online]; [retrieved Mar. 13, 2007]; retrieved from the internet http://news.bbc.co.uk/2/hi/technology/3368633.stm.
IGE, Buy WOW Gold, World of Warcraft Gold, FFXI Gil, Final Fantasy XI Gil, Lineage . . . , [online]; [retrieved Mar. 13, 2007]; retrieved from the internet http://www.ige.com.
IGE—About Us, [online]; [retrieved Mar. 13, 2007]; retrieved from the internet http:/www.ige/com/about.

* cited by examiner

*Primary Examiner* — Mila Airapetian
(74) *Attorney, Agent, or Firm* — Cantor Colburn LLP; William A. Kinnaman, Jr.

(57) ABSTRACT

A virtual business transaction is implemented between a first virtual world and a second virtual world by providing a searchable catalog that includes one or more items each comprising a virtual good, a virtual service, a real good, or a real service. An object representation is stored for each of the items. Each of the stored object representations is associated with metadata comprising any of digital rights metadata, ownership metadata, identity metadata, payment method metadata, or currency detail metadata. A set of transformation algorithms are established that are customized through a rule set. A request is received specifying a copying, modifying, or reselling of an item selected from the items in the searchable catalog. The copying, modifying, or reselling of the item from a first virtual world to a second virtual world is implemented using the set of transformation algorithms. An exchange of virtual currency is implemented between the first virtual world and the second virtual world using the set of transformation algorithms.

24 Claims, 8 Drawing Sheets

METHOD, HARDWARE PRODUCT, AND COMPUTER PROGRAM PRODUCT FOR IMPLEMENTING COMMERCE BETWEEN VIRTUAL WORLDS

TRADEMARKS

IBM® is a registered trademark of International Business Machines Corporation, Armonk, N.Y., U.S.A. Other names used herein may be registered trademarks, trademarks or products names of International Business Machines Corporation or other companies.

BACKGROUND OF THE INVENTION

1. Field of the Invention

This invention relates to the field of computer systems management and, in particular, to methods, hardware products, and computer program products for implementing commerce between virtual worlds.

2. Description of Background

One of the important goals of resource virtualization is being able to access a variety of resources using set of standard interfaces, irrespective of different security domains to which the resources may belong. A security domain can be described as any domain which uses a single user registry and associated authentication mechanisms for authentication.

A virtual economy is an emergent economy existing in a virtual persistent world, typically in the context of an Internet game. Present-day virtual economies share many of the following characteristics: (a) persistence—an electronic record is maintained for storing a presently existing state of a virtual world and a plurality of resource possessions of all participants, regardless of whether or not any participant is currently engaged in a session with the virtual world; (b) scarcity—participants may expend resources in the real world, such as time or money, to obtain goods and/or services in the virtual world; (c) specialization—the availability of resources to participants may vary. For example, a participant may control a virtual character who is able to produce certain goods, while other characters would have to purchase them. Because this results in comparative advantage, complex trade relationships and a division of labor result; (d) trade—participants are able to transfer goods and services to and from other participants; and (e) property Rights—an electronic record is maintained setting forth which goods and services belong to which participant. Gaming software code for implementing the virtual world should allow participants to dispose of goods or services according to whim. The existence of these conditions creates an economic system with properties similar to those seen in contemporary economies. These emergent economies are considered by most participants to be an asset of the game, giving an extra dimension of reality to play.

Virtual economies are observed in Multi-User Dungeons (MUDs) and massively multiplayer online role-playing games (MMORPGs), with the largest virtual economies being found in MMORPGs. Virtual economies also exist in life simulation games, where steps have been taken toward linking a virtual economy with the real world. For example, Second Life enables participants to buy and sell Linden Dollars (the official currency of the Second Life world) for real money via third party websites. Virtual economies also exist in browser-based internet games where "real" money can be spent and user-created shops opened.

MUDs are inventively structured social experiences accessed via the Internet, managed by a computer program, and often involving a loosely organized context or theme. Illustrative contexts include a rambling old castle with many rooms or a specific period in United States history. MUDs are also known as 3-D worlds. Some MUDs involve ongoing adventure games; others are educational in purpose; and a few are simply social in nature. MUD participants adopt a character or avatar when they join or log in to a MUD. Each MUD has its own name, special character and ambience, and set of rules. Although a few MUDs continue to be entirely text-based, newer MUDs use virtual reality settings to permit viewing of participating characters. However, even with virtual reality MUDs, one primary focus is on the exchange of text between participants who are logged in at a particular time. There are a number of variations on the MUD, including object-oriented MUDs known as MOOs.

MMORPGs represent a genre of online computer role-playing games (CRPGs) in which a large number of players interact with one another in a virtual world. Each of a plurality of respective players assumes the role of a corresponding fictional character (most commonly in a fantasy world), and takes control over that character's actions. MMORPGs are distinguished from single-player or small multi-player CRPGs by a larger number of players, and by the game's persistent world, which continues to exist and evolve while the player is away from the game. The majority of MMORPGs are based on traditional fantasy. Some employ hybrid themes that either merge or substitute fantasy elements with those of science fiction, sword and sorcery, or crime fiction. Still others use more obscure themes, including American comic books, the occult, and other recognizable literary genres.

MMORPGs are deployed using a client-server system architecture. The software that generates and persists the "world" runs continuously on a server, and players connect to it via client software. The client software may provide access to the entire playing world, or further 'expansions' may be required to be purchased to allow access to certain areas of the game. Players may purchase the client software for a one-time fee, although an increasing trend is for MMORPGs to work using pre-existing "thin" clients, such as a web browser. Some MMORPGs require payment of a monthly subscription to play. By nature, "massively multiplayer" games are always online, and most require some sort of continuous revenue (such as monthly subscriptions and advertisements) for maintenance and development. Depending on the number of players and the system architecture, a MMORPG might actually be run on multiple separate servers, each representing an independent world, where players from one server cannot interact with those from another. One illustrative MMORPG is EVE Online which accommodated around 200,000 players in the same world as of August 2007 and 41,690 online users in December 2007.

MMORPGs are very popular. Worldwide revenues for MMORPGs exceeded half a billion dollars in 2005, and US revenues exceeded one billion dollars in 2006. The largest virtual economies are currently found in popular MMORPGs such as Entropia Universe, World of Warcraft, and EVE Online. Many MMORPGs feature living economies, as virtual items and virtual currency have to be gained through play and have definite value for players. A supply-and-demand market exists for virtual items which crosses over into the real world. Thus, existing MMORPGs provide some or all of the following functionality: (a) the ability for players to sell an item to each other for in-game (virtual) currency; (b) bartering for items between players for items of similar value; (c) the purchase of in-game items for real-world currency; (d) exchanges of real-world currencies for virtual currencies; and (e) the creation of meta-currencies such as DKP, or Dragon Kill Points, to distribute in-game rewards.

Virtual world developers sell virtual items and virtual currency for real-world money. For example, a MMORPG named There has Therebucks which sell for US dollars. The currency in Second Life can be converted from Linden Dollars into US Dollars and vice versa. Rates fluctuate based on supply and demand, but over the last few years they have remained fairly stable. The currency in Entropia Universe, Project Entropia Dollars (PED), can be bought and redeemed for real-world money. On Dec. 14, 2004, an island in Project Entropia sold for US $26,500. One gamer also purchased a virtual space station for US $100,000 with plans to use it as a virtual nightclub.

Eye On MOGS, BuddyPlayer, Gold Price Watcher, GameUSD, WoW Gold Seeker and GamerPrice represent examples of web site that provide comparisons of virtual currency sellers from which real life earnings may be converted into virtual gold, platinum, ISK or Credits, depending on one's inhabited virtual world. For example, a cursory examination of the WoW Gold web site shows thousands of search results representing electronic vendors from which virtual gold can be purchased. Real money commerce in a virtual market has grown to become a multi billion dollar industry. This lucrative market has opened a whole new type of economy where the border between the real and the virtual is obscure.

Hundreds of companies are enormously successful in this new found market, with some virtual items being sold for hundreds or even thousands of dollars. Virtual real estate is earning real world money. For example, a bread deliveryman recently purchased a piece of virtual real estate for $750 on a popular MMORPG known as Ultima Online. This virtual property includes nine rooms, three stories, rooftop patio, and a wall of solid stonework in a prime location, nestled at the foot of a quiet coastal hillside. This property would have been perfect if it had actually existed. The purchaser of this virtual property represents a group of gamers that are not in the market for a real house but instead aim to own a small piece of the vast mythical world in which the MMORPG unfolds. Such trading of real money for virtual goods simply represents the development of virtual economies where the real and the synthetic worlds are meeting within a single economic sphere.

Buying and selling virtual cash is a laborious process. Many players have purchased virtual cash using auction sites such as Ebay, or have exchanged real cash for virtual cash by paying high transaction costs on specific dealer sites such as Player Auctions. However, using auction sites to complete a transfer of virtual cash involves a multi-step procedure. After virtual cash is purchased or won on an auction site, the purchaser or winner must arrange to meet other players inside different virtual worlds to consummate the transfer of virtual cash. Moreover, the operators of MMORPGs typically run several versions of their virtual world simultaneously on separate sets of servers known as "shards".

Swapping virtual cash between shards is laborious, but exchanging virtual cash directly from one MMORPG to another is almost impossible. The inability to efficiently and readily transfer virtual cash from one game to another inhibits the growth and development of virtual economies, despite the fact that game participants are already spending large sums of money buying and selling virtual cash, game artifacts, virtual weapons, and even complete characters. According to figures collated by economics professor Edward Castronova, more than US $9 million in trades were conducted in 2003 on Ebay category 1654 which includes internet games. In view of the foregoing considerations, what is needed is an improved technique for exchanging virtual currency across a plurality of different platforms and virtual worlds.

SUMMARY OF THE INVENTION

A virtual business transaction is implemented between a first virtual world and a second virtual world by providing a searchable catalog that includes one or more items each comprising a virtual good, a virtual service, a real good, or a real service. An object representation is stored for each of the items. Each of the stored object representations is associated with metadata comprising any of digital rights metadata, ownership metadata, identity metadata, payment method metadata, or currency detail metadata. A set of transformation algorithms are established that are customized through a rule set. The set of transformation algorithms include a first algorithm for transforming 3-dimensional (3-D) object format representations, a second algorithm for transforming digital rights, a third algorithm for transforming currency, and a fourth algorithm for transforming identity. A request is received specifying a copying, modifying, or reselling of an item selected from the items in the searchable catalog. The copying, modifying, or reselling of the item from a first virtual world to a second virtual world is implemented using the set of transformation algorithms. An exchange of virtual currency is implemented between the first virtual world and the second virtual world using the set of transformation algorithms.

Hardware products and computer program products corresponding to the above-summarized methods are also described and claimed herein. Other methods, hardware products, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
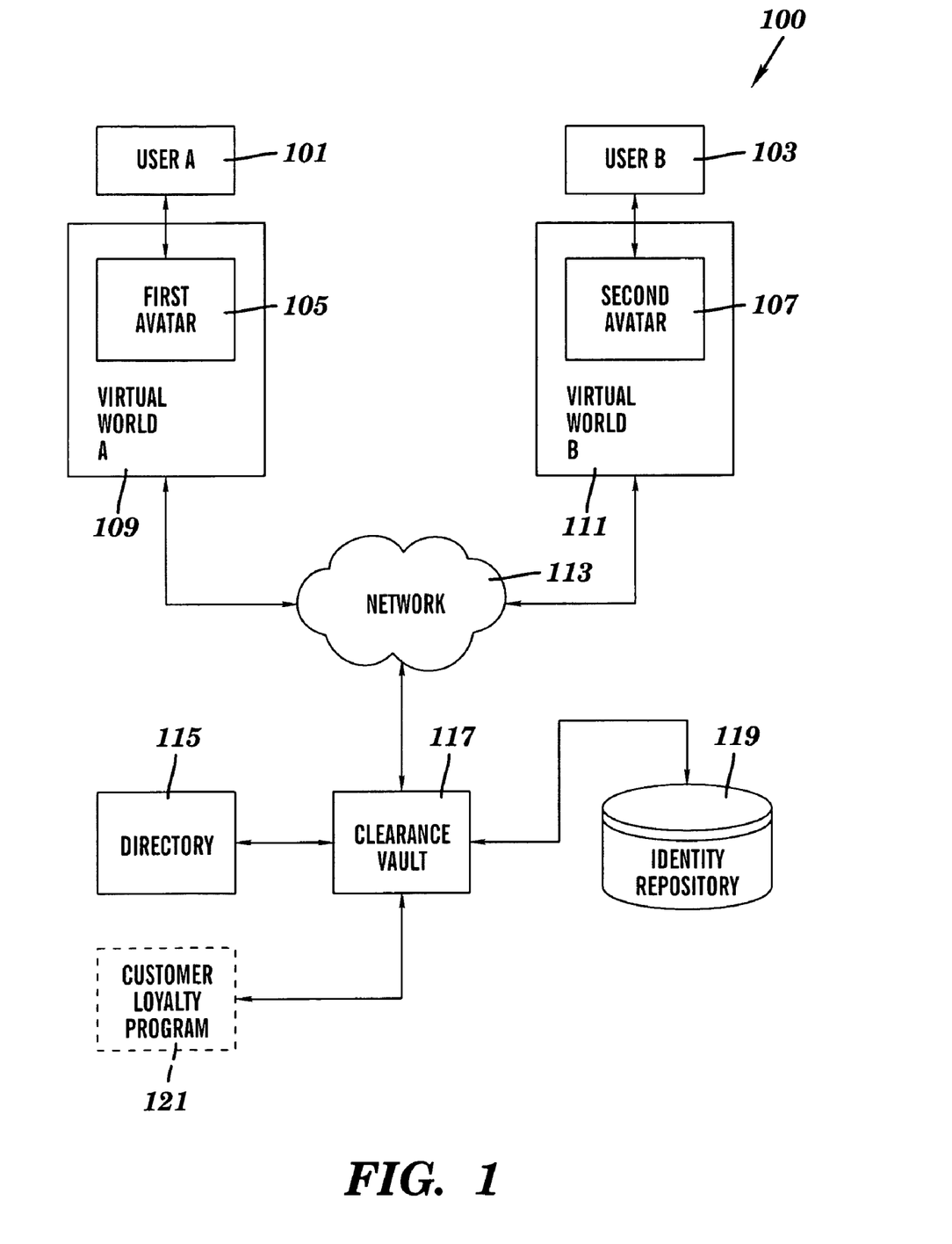
FIG. 1 is an architectural block diagram showing an illustrative system for implementing commerce between virtual worlds.

FIG. 1 is an architectural block diagram showing an illustrative system 100 for implementing commerce between virtual worlds. A first user, designated as user A 101, has adopted or created a first avatar 105 for interacting with a first virtual world, designated as virtual world A 109. A second user, designated as user B 103, has adopted or created a second avatar 107 for interacting with a second virtual world, designated as virtual world B 111. Virtual world A 109 may be implemented using a first server or a first set of servers executing virtual world software and operatively coupled to a network 113. Virtual world B 111 may be implemented using a second server or a second set of servers executing virtual world software and operatively coupled to the network 113. Network 113 may represent a network such as the public switched telephone network (PSTN), the Internet, an Intranet, a distributed network, an optical network, a wireless network, a wired network, or any of various combinations thereof Virtual world A 109 and virtual world B 111 could be different virtual worlds or, alternatively, virtual world A 109 and virtual world B 111 may represent different instances of a given virtual world. In other words, the first virtual world may, but need not, represent a first instance of a virtual world with the second virtual world representing a second instance of the virtual world, wherein the first and second virtual worlds are both implemented on a given platform.

A clearance vault 117 is operatively coupled to network 113. Clearance vault 117 may be implemented using a third server or a third set of servers executing clearance vault software capable of performing the method set forth in FIGS. 2A-2B, described hereinafter. Returning now to FIG. 1, clearance vault 117 is operatively coupled to a database in the form of an identity repository 119. Identity repository 119 is used to store catalog information about goods and buyers and sellers. Clearance vault 117 interacts with at least one virtual world, such as virtual world A 109 or virtual world B 111, over network 113 using open or private interfaces to obtain object details (e.g. 3D object definitions such as x3d or Collada) as well as metadata. Thus, clearance vault 117 interacts with at least one virtual world to obtain one or more details for an item to be listed in the searchable electronic catalog. A directory 115, operatively coupled to clearance vault 117, holds marketplace participant details of buyers and sellers including a federation of identity across multiple avatars 105, 107 for multiple virtual worlds 109, 111.

Potential buyers, such as user A 101 or user B 103, can select a good from an electronic catalog accessible from virtual world A 109 or virtual world B 111 and "test" the selected good in clearance vault 117 before virtual currency is exchanged for the good. Thus, an avatar 105 or 107 can try on an object like clothing or a gadget in a controlled environment, in the clearance vault 117. Although an avatar 105, 107 representation of a certain virtual world 109 or 111, respectively, is used, at that time the selected good (i.e., the selected object) is not transferred into an inventory maintained by the buyer's virtual world 109 or 111. One or more transformation services implemented by clearance vault 117 perform functions to turn an object represented in one 3D format into a different 3D format (e.g. x3d to Collada). Each of these transformations can be implemented as pluggable components. Transformations may also be performed for currency and digital rights. In certain situations, a loss of information may occur when the transformation is performed. For example, a target virtual world corresponding to the buyer may not support the fine-grained control that is supported by the originating world of the seller.

Since clearance vault 117 can be implemented with pluggable components, functions such as financial services and currency exchange can be delivered by external systems. For example, the charging of buyer (i.e, user A 101) and the crediting of seller (i.e., user B 103) can be implemented using an online service provided by PayPal™. All transactions are logged by clearance vault 117 and information for analysis of, for example, buying patterns can be performed on that historic data. Optionally, clearance vault 117 is operatively coupled to a customer loyalty program 121 for rewarding frequent purchasers of catalog items comprising goods or services.

Figure 2A:
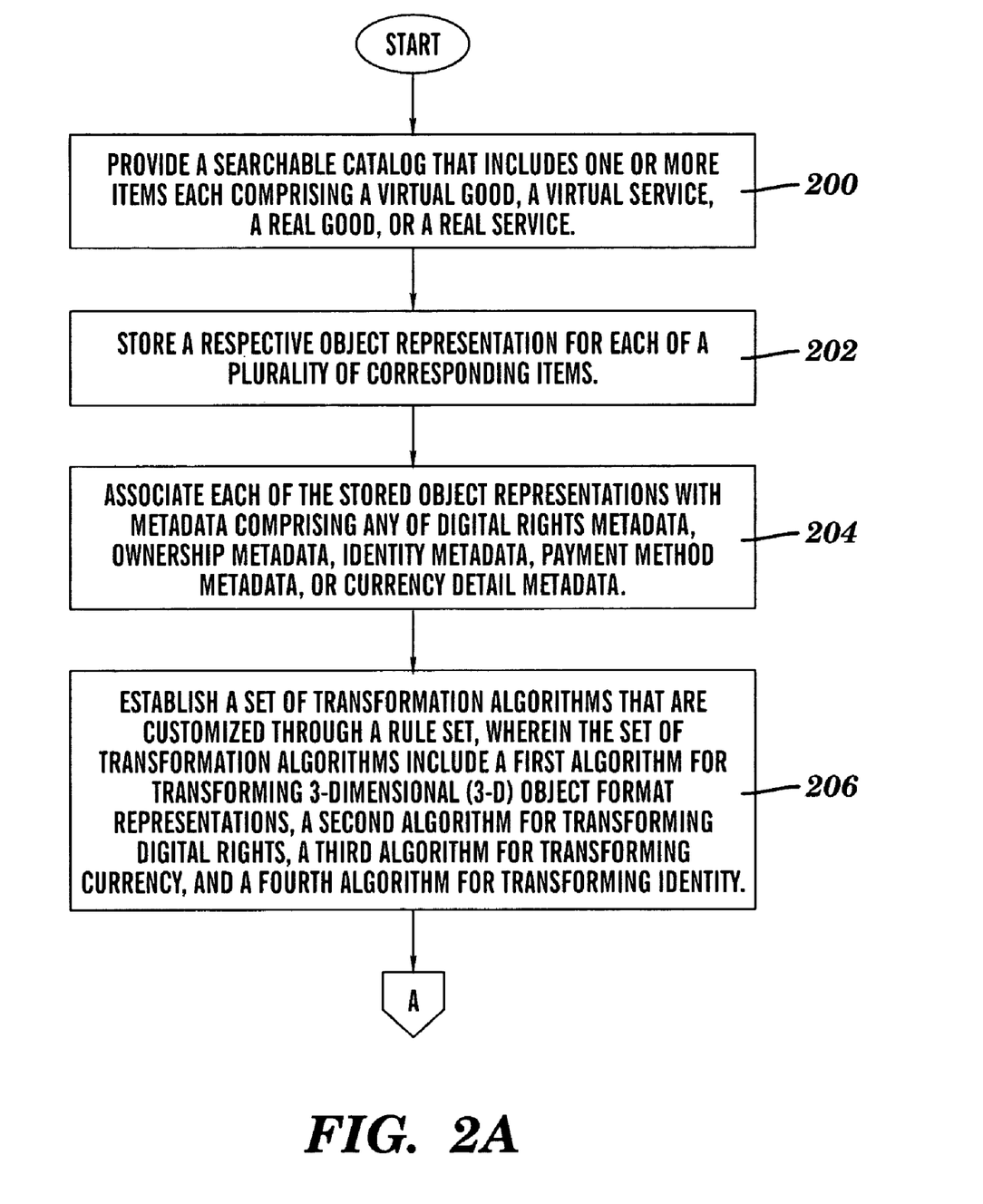
FIGS. 2A and 2B together comprise a flowchart showing an illustrative method for implementing commerce between virtual worlds.
Figure 2B:
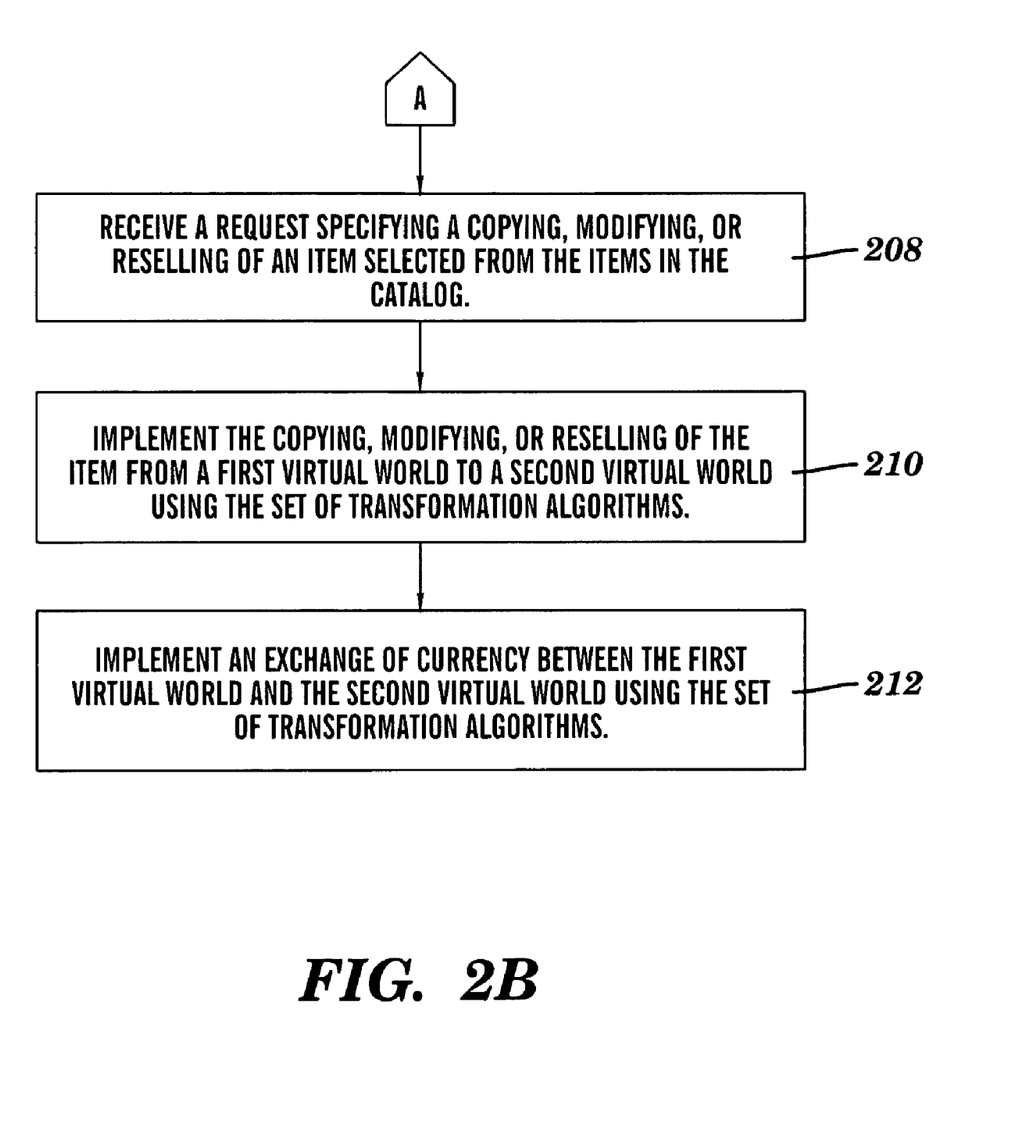

FIGS. 2A and 2B together comprise a flowchart showing an illustrative method for implementing commerce between virtual worlds such as virtual world A 109 and virtual world B 111 (FIG. 1). The operational sequence of FIG. 2 commences at block 200 where a searchable electronic catalog is provided that includes one or more items each comprising a virtual good, a virtual service, a real good, or a real service. At block 202, an object representation is stored for each of the items. Each of the stored object representations is associated with metadata comprising any of digital rights metadata, ownership metadata, identity metadata, payment method metadata, or currency detail metadata (block 204). A set of transformation algorithms are established that are customized through a rule set (block 206). The set of transformation algorithms include a first algorithm for transforming 3-dimensional (3-D) object format representations, a second algorithm for transforming digital rights, a third algorithm for transforming currency, and a fourth algorithm for transforming identity.

Next, a request is received specifying a copying, modifying, or reselling of an item selected from the items in the searchable catalog (block 208). The copying, modifying, or reselling of the item from a first virtual world to a second virtual world is implemented using the set of transformation algorithms (block 210). An exchange of virtual currency is implemented between the first virtual world and the second virtual world using the set of transformation algorithms (block 212).

Figure 3:
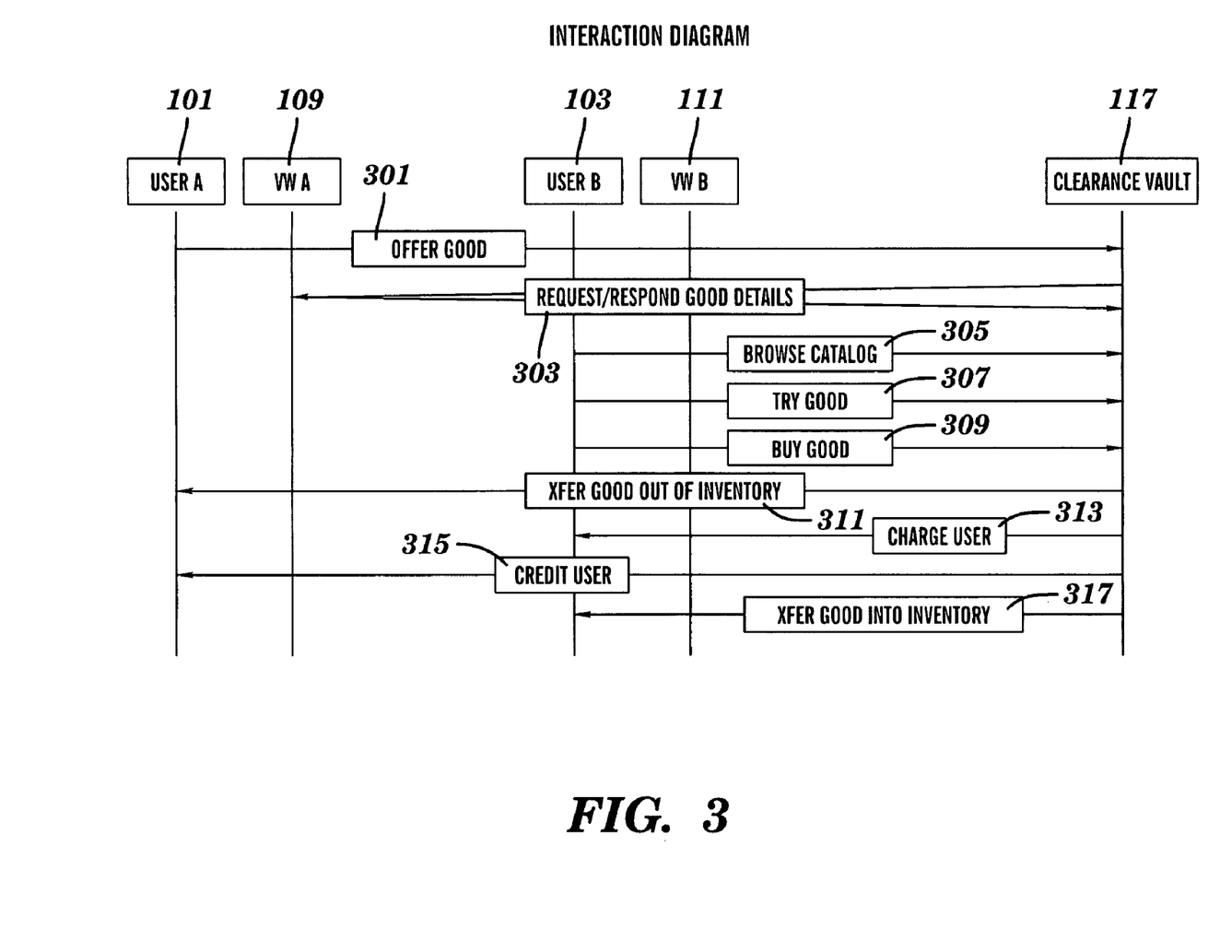
FIG. 3 is a first interaction diagram showing the manner in which the method of FIGS. 2A and 2B may be performed using the system of FIG. 1.

FIG. 3 is a first interaction diagram showing the manner in which the method of FIGS. 2A and 2B may be performed using the system of FIG. 1. User A 101 (FIGS. 1 and 3) of virtual world A 109 (FIGS. 1 and 3) offers a good to the clearance vault 117 (FIGS. 1 and 3) at block 301 (FIG. 3). Next, clearance vault 117 sends a request to virtual world A 109 for one or more details regarding the offered good, and a response is received from virtual world A 109 that includes the requested details (block 303). Clearance vault 117 then incorporates the offered good into an electronic catalog. Next, at block 305, user B 103 browses the electronic catalog. User B 103 tries the good at block 307, and an indication is received by clearance vault 117 that user B 103 intends to purchase the good (block 309). Clearance vault 117 transfers the good out of user A 101 inventory (block 311), and then charges user B 103 for the good (block 313). Clearance vault 117 credits user A 101 for the good at block 315, and transfers the good into user B 103 inventory (block 317).

Figure 4:
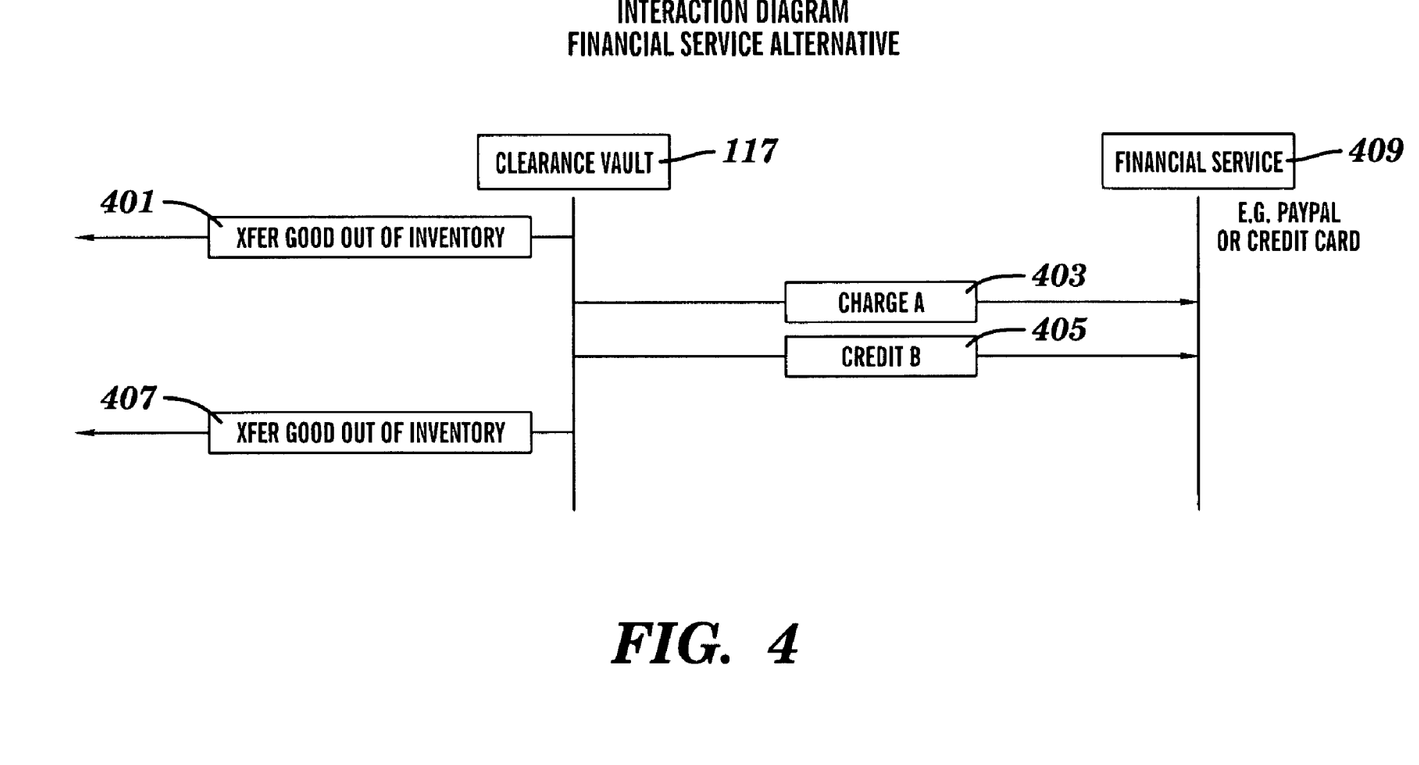
FIG. 4 is a second interaction diagram showing the manner in which the method of FIGS. 2A and 2B may be performed using the system of FIG. 1 in conjunction with an external billing service.

FIG. 4 is a second interaction diagram showing the manner in which the method of FIGS. 2A and 2B may be performed using the system of FIG. 1 in conjunction with an external financial service 409 capable of implementing billing functions, such as PayPal™ or a credit card. At block 401, clearance vault 117 (FIGS. 1 and 4) transfers a good out of inventory for user B 103 (FIG. 1). Next, at block 403 (FIG. 4), clearance vault 117 (FIGS. 1 and 4) transmits a request to financial service 409 (FIG. 4) instructing financial service 409 to charge user A 101 (FIG. 1) for the good that was transferred out of inventory. At block 405 (FIG. 4), clearance vault 117 (FIGS. 1 and 4) transmits a request to financial service 409 (FIG. 4) instructing financial service 409 to credit user B 103 (FIG. 1) for the good that was transferred out of inventory. At block 407 (FIG. 4), clearance vault 117 (FIGS. 1 and 4) transfers the good out of the inventory of user B 103 (FIG. 1) and into the inventory of user A 101.

Figure 5:
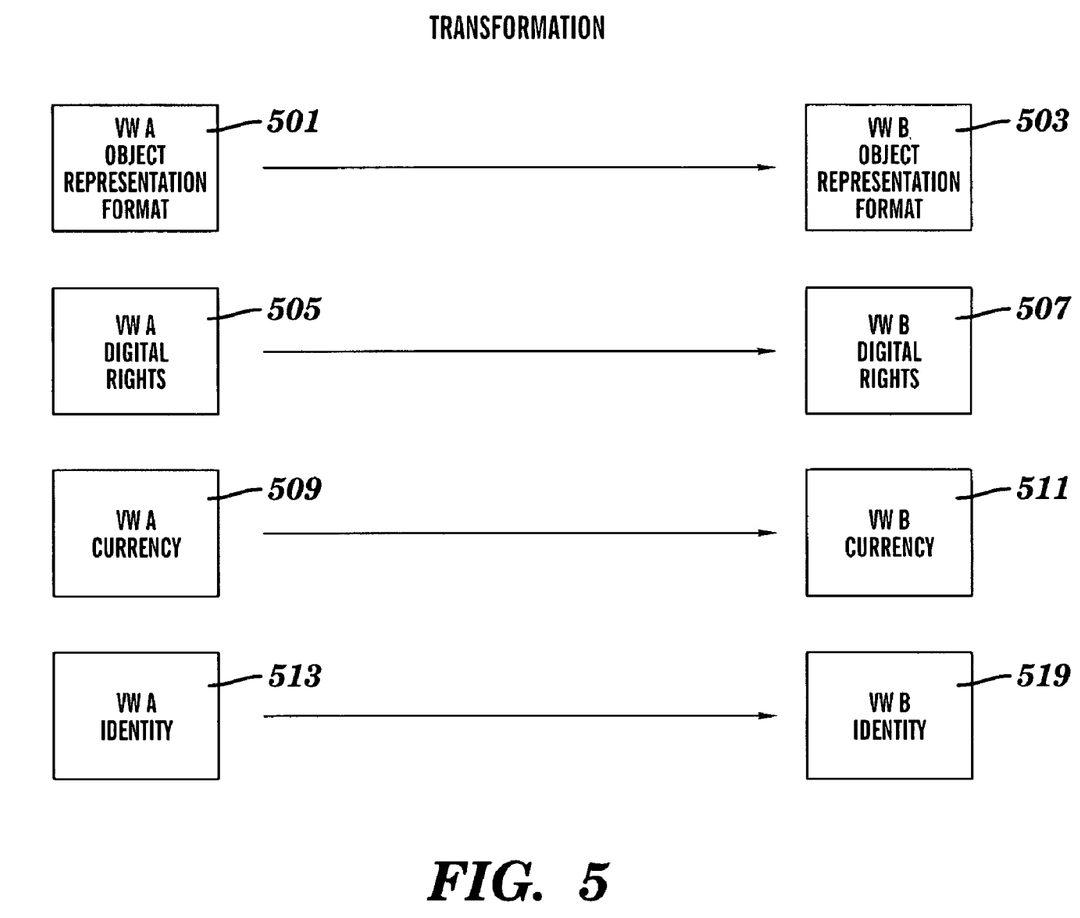
FIG. 5 is a data flow diagram showing an illustrative data flow for performing a mapping transformation.

FIG. 5 is a data flow diagram showing an illustrative data flow for performing a mapping transformation. A virtual world A object representation format 501 is transformed into a virtual world B object representation format 503. Virtual world A digital rights 505 are transformed into virtual world B digital rights 507. Virtual world A currency 509 is transformed into virtual world B currency 511. A virtual world A identity 513 is transformed into a virtual world B identity 519. These transformations are performed in conjunction with blocks 206 and 210 of FIGS. 2A and 2B.

Figure 6:
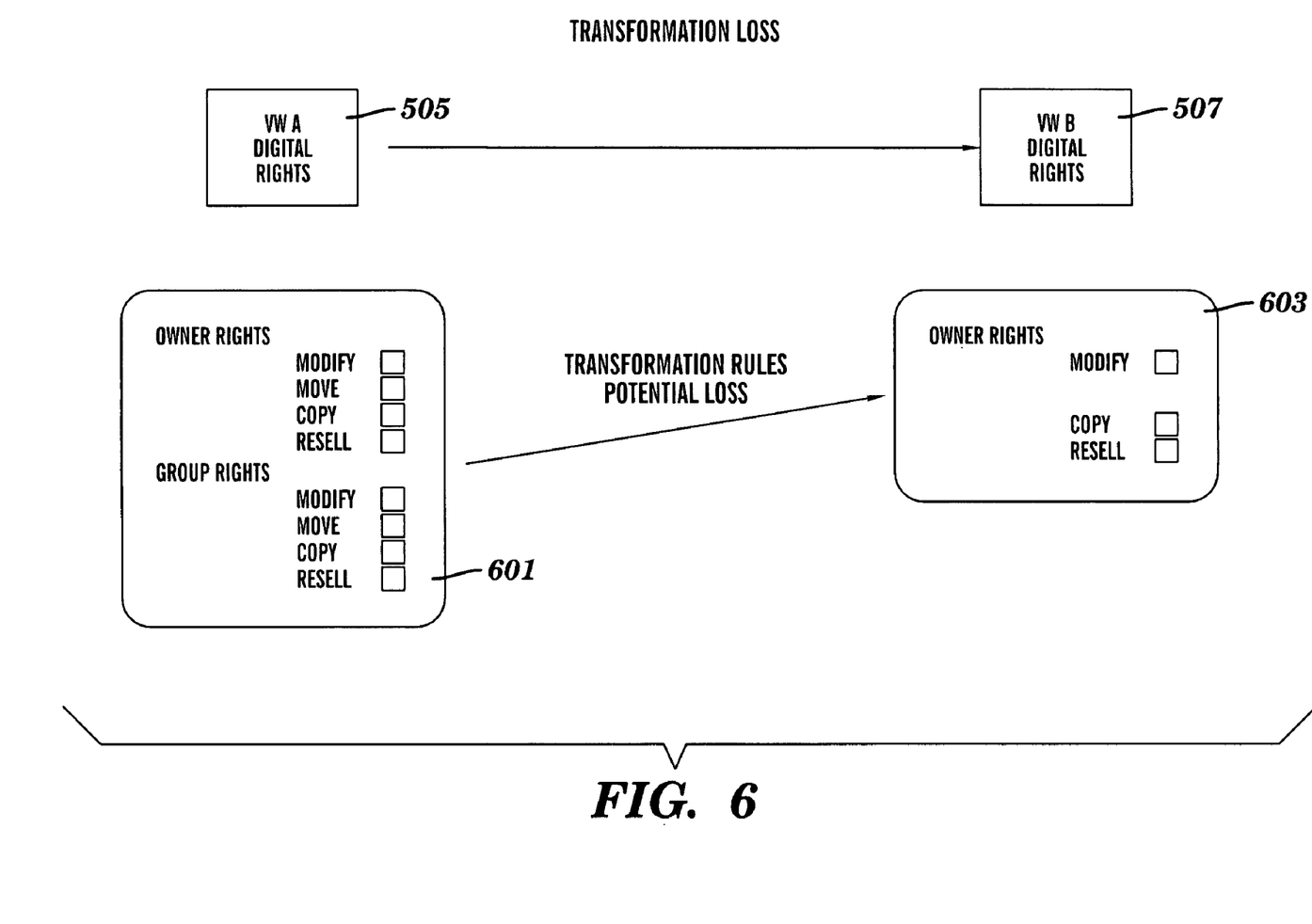
FIG. 6 is a data flow diagram showing an illustrative loss that may occur when the mapping transformation of FIG. 5 is executed.

FIG. 6 is a data flow diagram showing an illustrative loss that may occur when one of the mapping transformations of FIG. 5 is executed, wherein virtual world A digital rights 505 (FIGS. 5 and 6) are transformed into virtual world B digital rights 506 (FIGS. 5 and 6). In virtual world A 109 (FIG. 1), virtual world A digital rights 505 (FIG. 6) are set forth in a first data structure 601 that includes owner rights and group rights. The owner rights include modify, move, copy, and resell wherein these rights pertain to items in the electronic catalog or stored in an owner inventory or both. The group rights include modify, move, copy, and resell. However, in virtual world B 111 (FIG. 1), virtual world B digital rights 507 (FIG. 6) are set forth in a second data structure 603 that only includes owner rights, wherein the owner rights only include modify, copy, and resell.

Figure 7:
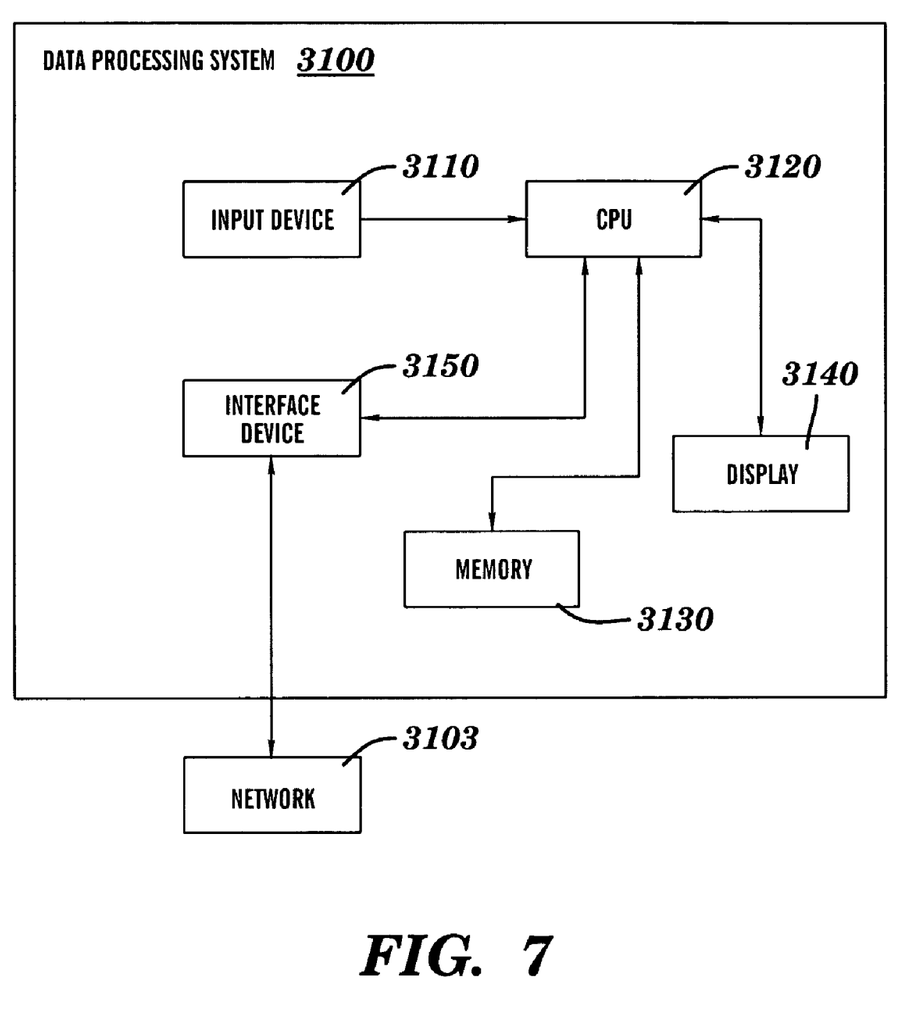
FIG. 7 is a block diagram setting forth an exemplary computer program product or hardware product for implementing commerce between virtual worlds.

FIG. 7 is a block diagram setting forth an exemplary computer program product or hardware product for implementing commerce between virtual worlds. It is to be clearly understood that FIG. 7 is illustrative in nature, as other systems, devices, or apparatuses not shown in FIG. 7 may also be used to implement embodiments of the invention. A data processing system 3100 includes an input device 3110, a central processing unit ("CPU") 3120, memory 3130, a display 3140, and an interface device 3150. The input device 3110 may include a keyboard, a mouse, a trackball, or a similar device. The CPU 3120 may include dedicated coprocessors and memory devices. The memory 3130 may include RAM, ROM, databases, or disk devices. The display 3140 may include a computer screen, terminal device, a hardcopy producing output device such as a printer or plotter, or a similar device. The interface device 3150 may include a connection or interface to a network 3103 such as the Internet, an intranet, a local area network (LAN), or a wide area network (WAN). Optionally, the data processing system 3100 may be linked to other data processing systems over the network 3103. These other data processing systems may, but need not, include an application for implementing commerce between virtual worlds. Of course, the data processing system 3100 may contain additional software and hardware, a description of which is not necessary for understanding the invention.

The data processing system 3100 has stored therein data representing sequences of instructions which, when executed, cause the method described in connection with FIGS. 2A and 2B to be performed. Thus, the data processing system 3100 includes computer executable programmed instructions for directing the system 3100 to implement any of the embodiments of the present invention. The programmed instructions may be embodied in at least one hardware, firmware, or software module 3170 resident in the memory 3130 of the data processing system 3100. Alternatively or additionally, the programmed instructions may be embodied on a computer readable medium (such as a CD disk, floppy disk, or USB-readable semiconductor storage device) which may be used for transporting the programmed instructions to the memory 3130 of the data processing system 3100. Alternatively or additionally, the programmed instructions may be embedded in a computer-readable, signal or signal-bearing medium that is uploaded to the network 3103 by a vendor or supplier of the programmed instructions, and this signal or signal-bearing medium may be downloaded through an interface 3150 to the data processing system 3100 from the network 3103 by end users or potential buyers.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described. Therefore, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for implementing a virtual business transaction between a first virtual world implemented on one or more first servers operatively coupled to a network and a second virtual world implemented on one or more second servers operatively coupled to the network, the method including:
   providing a searchable electronic catalog, through a clearance vault implemented on one or more third servers operatively coupled to the network, the searchable electronic catalog including one or more items each comprising a virtual good, a virtual service, a real good, or a real service;
   storing an object representation for each of the items in an identity repository database;
   establishing a set of transformation algorithms that are customized through a rule set;
   receiving a request specifying a copying, modifying, or reselling of an item selected from the items in the searchable electronic catalog;
   implementing the copying, modifying, or reselling of the item from the first virtual world to the second virtual world using the set of transformation algorithms; and
   implementing an exchange of virtual currency between the first virtual world and the second virtual worlds using the set of transformation algorithms, by directly crediting a first user of the first virtual world offering the item, and by directly charging a second user of the second virtual world purchasing the item.

2. The method of claim 1 wherein each of the stored object representations is associated with metadata comprising any of digital rights metadata, ownership metadata, identity metadata, payment method metadata, or currency detail metadata.

3. The method of claim 1 wherein the set of transformation algorithms include a first algorithm for transforming 3-dimensional (3-D) object format representations, a second algorithm for transforming digital rights, a third algorithm for transforming currency, and a fourth algorithm for transforming identity.

4. The method of claim 1 wherein the first virtual world represents a first instance of a virtual world and the second virtual world represents a second instance of the virtual world, and the first and second virtual worlds are both implemented on a given platform.

5. The method of claim 1 further comprising using an identity repository to store catalog information about goods and buyers and sellers.

6. The method of claim 1 further comprising interacting with at least one virtual world over a network using open or private interfaces to obtain one or more details and metadata for an item to be listed in the searchable electronic catalog.

7. The method of claim 1 further comprising using a directory to hold marketplace participant details of buyers and sellers including a federation of identity across a plurality of avatars from a plurality of virtual worlds.

8. A computer program product comprising a storage medium readable by a processing circuit and storing instructions for execution by the processing circuit for facilitating a method for implementing a virtual business transaction between a first virtual world and a second virtual world, the method including:
   providing a searchable electronic catalog that includes one or more items each comprising a virtual good, a virtual service, a real good, or a real service;
   storing an object representation for each of the items;
   establishing a set of transformation algorithms that are customized through a rule set;
   receiving a request specifying a copying, modifying, or reselling of an item selected from the items in the searchable electronic catalog;
   implementing the copying, modifying, or reselling of the item from the first virtual world to the second virtual world using the set of transformation algorithms; and
   implementing an exchange of virtual currency between the first virtual world and the second virtual world using the set of transformation algorithms, by directly crediting a first user of the first virtual world offering the item, and by directly charging a second user of the second virtual world purchasing the item.

9. The computer program product of claim 8 wherein each of the stored object representations is associated with metadata comprising any of digital rights metadata, ownership metadata, identity metadata, payment method metadata, or currency detail metadata.

10. The computer program product of claim 8 wherein the set of transformation algorithms include a first algorithm for transforming 3-dimensional (3-D) object format representations, a second algorithm for transforming digital rights, a third algorithm for transforming currency, and a fourth algorithm for transforming identity.

11. The computer program product of claim 8 wherein the first virtual world represents a first instance of a virtual world and the second virtual world represents a second instance of the virtual world, and the first and second virtual worlds are both implemented on a given platform.

12. The computer program product of claim 8 further comprising using an identity repository to store catalog information about goods and buyers and sellers.

13. The computer program product of claim 8 further comprising interacting with at least one virtual world over a network using open or private interfaces to obtain one or more details and metadata for an item to be listed in the searchable electronic catalog.

14. The computer program product of claim 8 further comprising using a directory to hold marketplace participant details of buyers and sellers including a federation of identity across a plurality of avatars from a plurality of virtual worlds.

15. A hardware product comprising a storage medium readable by a processing circuit and storing instructions for execution by the processing circuit for facilitating a method for implementing a virtual business transaction between a first virtual world and a second virtual world, the method including:

provi­ding a searchable electronic catalog that includes one or more items each comprising a virtual good, a virtual service, a real good, or a real service;

storing an object representation for each of the items;

establishing a set of transformation algorithms that are customized through a rule set;

receiving a request specifying a copying, modifying, or reselling of an item selected from the items in the searchable electronic catalog;

implementing the copying, modifying, or reselling of the item from the first virtual world to the second virtual world using the set of transformation algorithms; and implementing an exchange of virtual currency between the first virtual world and the second virtual world using the set of transformation algorithms, by directly crediting a first user of the first virtual world offering the item, and by directly charging a second user of the second virtual world purchasing the item.

16. The hardware product of claim 15 wherein each of the stored object representations is associated with metadata comprising any of digital rights metadata, ownership metadata, identity metadata, payment method metadata, or currency detail metadata.

17. The hardware product of claim 15 wherein the set of transformation algorithms include a first algorithm for transforming 3-dimensional (3-D) object format representations, a second algorithm for transforming digital rights, a third algorithm for transforming currency, and a fourth algorithm for transforming identity.

18. The hardware product of claim 15 wherein the first virtual world represents a first instance of a virtual world and the second virtual world represents a second instance of the virtual world, and the first and second virtual worlds are both implemented on a given platform.

19. The hardware product of claim 15 further comprising using an identity repository to store catalog information about goods and buyers and sellers.

20. The hardware product of claim 15 further comprising interacting with at least one virtual world over a network using open or private interfaces to obtain one or more details and metadata for an item to be listed in the searchable electronic catalog.

21. The hardware program product of claim 15 further comprising using a directory to hold marketplace participant details of buyers and sellers including a federation of identity across a plurality of avatars from a plurality of virtual worlds.

22. The method of claim 3, wherein the second algorithm for transforming digital rights is configured to alter digital rights transferred from the first virtual world to the second virtual world, such that resulting digital rights in the second virtual world is a subset of the digital rights in the first virtual world, with one or more rights from the first virtual world being lost in the second virtual world.

23. The computer program product of claim 10 wherein the second algorithm for transforming digital rights is configured to alter digital rights transferred from the first virtual world to the second virtual world, such that resulting digital rights in the second virtual world is a subset of the digital rights in the first virtual world, with one or more rights from the first virtual world being lost in the second virtual world.

24. The hardware program product of claim 17 wherein the second algorithm for transforming digital rights is configured to alter digital rights transferred from the first virtual world to the second virtual world, such that resulting digital rights in the second virtual world is a subset of the digital rights in the first virtual world, with one or more rights from the first virtual world being lost in the second virtual world.

* * * * *